united States Patent Office
3,438,946
Patented Apr. 15, 1969

3,438,946
FLUOROALKYL-SUBSTITUTED ESTERS, DIESTERS, AND POLYMERS THEREFROM
Bernard M. Lichstein, Elizabeth, and Cyril Woolf, Morristown, N.J., assignors to Allied Chemical Corporation, New York, N.Y., a corporation of New York
No Drawing. Filed Dec. 6, 1966, Ser. No. 599,358
Int. Cl. C08g 17/06; C08f 3/64; C09c 69/62
U.S. Cl. 260—75
9 Claims

ABSTRACT OF THE DISCLOSURE

New fluorine-containing esters and diesters and their polymers derived from fluorinated dihydric alcohols. The esters are prepared by esterifying the alcohols in known manner. They are useful as lubricants and heat transfer media, and as intermediates for the preparation of polymeric materials containing fluorine, which are useful as hydrophobic and oleophobic coatings. The diesters can form polyesters or, in the case of esters containing vinyl unsaturation, can polymerize through the vinyl groups to give linear polymers having fluorine-substituted side chains.

---

The esters of the invention may be represented generally by the formula:

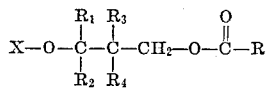

wherein $R_1$ and $R_2$ are perhalogenated alkyl radicals in which the halogen atoms are selected from the group consisting of fluorine and chlorine with at least one fluorine atom being attached to each carbon atom, $R_3$ and $R_4$ are members independently selected from the group consisting of hydrogen and alkyl radicals, R is an organic radical and X is a member selected from the group consisting of hydrogen and an

radical, wherein R has the meaning given above. Preferably $R_1$ and $R_2$ each contain from 1 to 5 carbon atoms and when $R_3$ and $R_4$ are alkyl groups, each contains 1 to 5 carbon atoms. These esters are thermally stable compounds useful, for example, as lubricants and heat transfer media. They also form thermally stable polymers which can be formed into various shapes including, for example, films and fibers. The polymers also have utility as water- and oil-resistant coatings.

The esters and diesters of our invention can be prepared by esterifying a fluorinated dihydric alcohol having the formula:

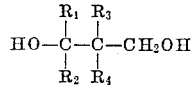

wherein $R_1$, $R_2$, $R_3$ and $R_4$ are as defined above, with one or more carboxylic acids, or with the acyl halide, anhydride or ester derivatives of such acids.

The fluorinated dihydric alcohols described above and methods for their preparation are disclosed in our copending application U.S. Ser. No. 539,265, filed Apr. 1, 1966. As described therein, these fluorinated dihydric alcohols can be prepared by reacting a perhalogenated ketone with an aldehyde, preferably in the presence of a suitable catalyst such as alkali metal fluorides and alkaline earth metal fluorides, in a mol ratio of ketone to catalyst of from about 10:1 to about 100:1 to form the corresponding fluoroalkyl-substituted aldehyde. These aldehydes may thereafter be reduced to the corresponding fluorinated dihydric alcohols in known manner.

To prepare the novel esters of our invention these alcohols are appropriately reacted such as with a carboxylic acid or its corresponding acid halide, acid anhydride or ester. Good results have been obtained by reaction of the fluorinated dihydric alcohol with an acid chloride or acid anhydride by admixing the reactants and maintaining them at about reflux temperatures. One mol of carboxylic acid or its derivative for each mol of fluorinated dihydric alcohol is reacted when a monoester is desired, and two mols of acid when the diester is desired. Use of an excess of either reactant is not precluded. As is known, a tertiary hydroxyl group adjacent to perhalomethyl groups is less reactive than a primary hydroxy group and esterification will occur at the hydroxyl group adjacent to the hydrogen-substituted carbon atom first. An elevated temperature of reaction may be required to esterify the tertiary hydroxy group. When an excess of carboxylic acid or its derivative is present, a mixture of ester and diester can be obtained. These products can be separated from each other and from unreacted starting materials, etc., in any convenient manner such as by fractional distillation.

The presence of a catalyst is not required, but in some cases an improved rate of reaction and higher overall yield may be obtained by using a catalyst. The optimum conditions for preparing each ester and diester may vary somewhat but can be readily determined by test runs for a given system.

Carboxylic acids suitable for use in the invention can be written as

HOOC—R wherein R represents an organic radical. Examples of such carboxylic acids include saturated aliphatic carboxylic acids such as acetic, propionic, butyric, valeric, caproic and heptylic acids; halogen-substituted aliphatic acids such as fluoroacetic, chloroacetic, dichloroacetic, trichloroacetic, α- or β-chloropropionic acids; unsaturated aliphatic carboxylic acids such as acrylic, methacrylic, vinylacetic and crotonic acids; aromatic carboxylic acids such as benzoic and the toluic acids; halogen-substituted aromatic acids such as the chloro- and bromobenzoic acids; substituted aromatic acids such as salicylic acid and phenylacetic acid; heterocyclic acids such as nicotinic acid, and the like. Suitable acid halides include acetyl fluoride, acetyl chloride, acetyl bromide, chloroacetyl chloride, propionyl chloride, the butyryl chlorides, valeryl chlorides, caproyl chlorides, acrylyl chlorides, benzoyl chlorides, and the like. Suitable acid anhydrides include acetic anhydride, propionic anhydride, n-butyric anhydride, valeric anhydride, benzoic anhydride, perfluoroacetic anhydride, and the like. Esters, including for instance, methyl esters and ethyl esters of any of the above-named acids may be employed.

In addition to the preparation of the esters and diesters described above, polyesters can be prepared by a condensation reaction between the fluorinated dihydric alcohols described hereinabove and difunctional carboxylic acids, their acid halides, esters and acid anhydrides. These polyesters can be described as having recurring units of the formula:

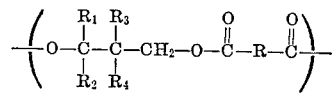

wherein R, $R_1$, $R_2$, $R_3$ and $R_4$ have the meanings given above.

Suitable dicarboxylic acids can be written as

HOOC—R—COOH wherein R is as described above. Examples of such dicarboxylic acids include aliphatic acids such as malonic, succinic, glutaric, adipic, pimelic, suberic, azelaic, sebacic and glutaconic acids; aromatic acids usch as phthaloyl, terephthaloyl, isophthaloyl and the phenylene diacetic acids; hetercyclic acids such as quinolinic acid, and the like. There corresponding acid halides, esters and acid anhydrides can also be employed.

In a typical procedure for preparing these polyesters, a fluorinated dihydric alcohol, as described hereinabove, is admixed with a difunctional carboxylic acid chloride and the temperature increased gradually driving off hydrogen chloride until all evolution of gas ceases. Heating at temperatures up to the decomposition temperature of the resultant polyester, may be continued as desired. An inert atmosphere is preferred during the reaction to prevent side reactions and degradation reactions of the polymeric product. The polymer can be recovered and purified if required as will be known to one skilled in the art.

In addition to the above-described polyesters, we have also found that fluorine-containing polymers can be obtained by an addition polymerization of an ester-substituted vinyl compound, prepared in accordance with the invention, by reacting the fluorinated dihydric alcohols described hereinabove with a vinyl-substituted carboxylic acid, or its corresponding acid halide, ester or anhydride. These polymers can be described as having recurring units of the formula:

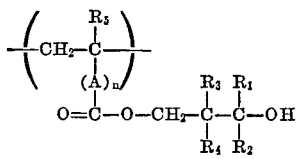

wherein $R_1$, $R_2$, $R_3$ and $R_4$ have the meanings given above, $R_5$ is hydrogen or a lower alkyl radical having from 1 to 3 carbon atoms, A is an alkylene radical having from 1 to 3 carbon atoms and $n$ is an integer from 0 to 1.

Suitable vinyl-substituted carboxylic acids can be written as $CH_2=CR_5(A)_nCOOH$ wherein $R_5$, A and $n$ are as described above. Examples of such acids are acrylic acid, vinyl acetic acid and methacrylic acid. Their corresponding acid halides such as acrylyl chloride, esters such as vinyl acetate and anhydrides can also be employed.

As is shown, polymerization of substituted vinyl compositions proceeds by a chain reaction mechanism generally initiated by the formation of a free radical induced either thermally, photochemically or by the decomposition of a peroxide. In a typical procedure, the ester-substituted vinyl monomers of the invention can be polymerized in the presence of light or a suitable catalyst at a temperature determined by its decomposition temperature. The polymer product can be purified, if required, as will be known to one skilled in the art.

The following examples are given to further illustrate the invention, but it is to be understood that the invention is not meant to be limited to the details described therein. In the examples, all parts are by weight.

EXAMPLE 1

103.5 parts of 1,1-bis(perfluoromethyl)-1,3-propane diol were charged to a reaction vessel and heated to 130° C. 450 parts of perfluoroacetic anhydride were added slowly while maintaining a nitrogen atmosphere. After one hour, the temperature had dropped to 50° C. Heating was continued at the maximum temperature obtainable for an additionl 17 hours. The product was cooled to room temperature and distilled at 160–161° C.

A 79.7% by weight yield of 3-hydroxy-4,4,4-trifluoro-3-trifluoromethyl butyl trifluoroacetate was obtained having an index of refraction $n_D^{25°\ C.}$ 1.3264. Infrared analysis confirmed the monoester structure. The results of elemental analysis are as follows: Calculated for $C_7H_5F_9O_3$: C, 27.3; H, 1.64; F, 55.5. Found: C, 27.6; H, 1.76; F, 54.6.

EXAMPLE 2

95 parts of 1,1-bis(perfluoromethyl)-1,3-propane diol and 127 parts of benzoyl chloride were mixed, heated to 140° C. and stirred under a stream of nitrogen for 17 hours. The products were fractionally distilled.

A 14.1% by weight yield of 3-hydroxy-4,4,4-trifluoro-3-trifluoromethyl butyl benzoate was obtained as a solid having a melting point of 66.5–68.0° C. The results of elemental analysis are as follows: Calculated for $C_{12}H_{10}F_6O_3$: C, 45.6; H, 3.19; F, 36.1. Found: C, 45.7; H, 3.04; F, 37.4.

The liquid fractions were recombined and redistilled A 77.1% by wegiht yield of the diester 1,3-bis(4,4,4-trifluoro-3-trifluoromethyl butyl)dibenzoate having a boiling point of 130° C. and index of refraction $n_D^{25°\ C.}$ 1.4852 was obtained. It was found to be 95.6% pure by vapor phase chromatographic analysis. Elemental analysis was calculated for $C_{19}H_{14}F_6O_4$: C, 54.3; H, 3.36; F, 27.1. Found: C, 54.3; H, 3.26; F, 27.3.

The diester was tested for thermal stability by charging to a heavy walled tube and heating in an aluminum block. No decomposition was noted up to 260° C. Decomposition occurred at about 290–300° C. Another sample was heated in a tube at 250° C. for 72 hours. The color of the sample darkened only slightly. Infrared spectra of the treated and the original samples were compared and found to be identical.

EXAMPLE 3

116.5 parts of 1,1-bis(perfluoromethyl)-1,3-propane diol and 113.0 parts of phthaloyl chloride were mixed in a reaction flask. The temperature rose spontaneously to 35° C. as hydrogen chloride was evolved. The temperature was gradually increased to 175° C. with continuing evolution of hydrogen chloride. Heating was continued at 175–180° C. for about 20 hours. On cooling, a red-brown solid formed which was soluble in carbon tetrachloride. The solid product was refluxed for 15 minutes in methanol and dried in a vacuum oven at 65° C.

Elemental analysis calculated for a polymer having recurring units of the formula:

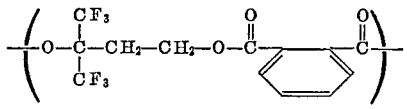

is C, 45.6; H, 2.35; F, 33.3. Found: C, 45.0; H, 2.40; F, 34.2. The structure for poly[1,3-(4,4,4-trifluoro-3-trifluoromethyl-butyl)phthalate] was also confined by infrared analysis.

A fiber was pulled from a solution of the polymer in carbon tetrachloride and a brittle film was cast from the solution.

EXAMPLE 4

Equimolar amounts of 1,1-bis(perfluoromethyl)-1,3-propane diol and adipoyl chloride are reacted following the procedure given in Example 3. A solid polymer having the formula:

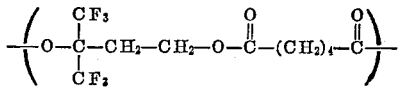

is obtained.

EXAMPLE 5

119 parts of 1,1 - bis(perfluoromethyl) - 1,3 - propane diol and 102 parts of acrylyl chloride were mixed in a reaction vessel and the temperature gradually increased. At 48° C. hydrogen chloride was evolved. The flask was maintained at 70° C. overnight, heated to 100° C. for two hours and cooled to room temperature. The product was distilled under vacuum at 50° C. 3-hydroxy-4,4,4 - trifluoro - 3 - trifluoromethyl butyl acrylate had an index of refraction $n_D^{25°\,C.}$ 1.3772. The results of elemental analysis are as follows: Calculated for $$C_8H_8F_6O_3$$

C, 36.1; H, 3.13; F, 42.8. Found: C, 36.6; H, 3.12; F, 42.1.

The product polymerized to a gel on standing overnight. It was chilled in Dry Ice to a tough, rubbery product. A portion was ground and extracted in chloroform overnight and the solvent removed. The polymer was dried overnight at 55° C. under vacuum and heated to 110° C. for three hours. The resultant polymer was clear, tough and rubbery.

Elemental analysis calculated for a polymer having recurring units of the formula:

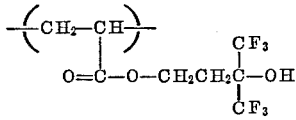

is C, 36.1; H, 3.13; F, 42.8. Found: C, 36.3; H, 3.2; F, 42.2.

The polymer was pressed into a film which was not wetted by water nor by mineral oil. Differential thermal analysis of the film in air determined the polymer film was stable up to about 260° C. Thermal gravimetric analysis in nitrogen resulted in only a 0.5% weight loss up to about 335° C. and only 5% weight loss up to about 365° C.

EXAMPLE 6

The procedure given in Example 5 is repeated but substituting vinyl acetyl chloride as coreactant with 1,1,-bis (perfluoromethyl) - 1,3 - propane diol. When evolution of hydrogen chloride is complete, the product is distilled and collected. The ester product, 3 - hydroxy - 4,4,4-trifluoro - 3 - trifluoromethyl butyl vinyl acetate is allowed to stand overnight. Excess monomer is removed by extraction from the resultant solid and a tough, rubbery polymer is obtained having recurring units of the formula:

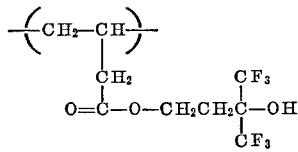

It will be apparent that many modifications and variations may be effected without departing from the scope of the novel concepts of the present invention, and the illustrative details disclosed herein are not to be construed as imposing undue limitations on the invention.

We claim:

1. A compound having the formula:

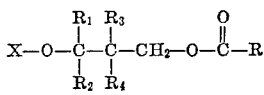

wherein $R_1$ and $R_2$ are perhalogenated alkyl radicals of 1 to 5 carbon atoms in which the halogen atoms are selected from the group consisting of fluorine and chlorine, with at least one fluorine atom being attached to each carbon atom, $R_3$ and $R_4$ are members independently selected from the groups consisting of hydrogen and alkyl radicals of 1 to 5 carbon atoms, R is a residue of a carboxylic acid and X is a member selected from the group consisting of hydrogen and an

radical wherein R has the meaning given above.

2. 3 - hydroxy - 4,4,4 - trifluoro - 3 - trifluoromethyl butyl trifluoroacetate.

3. 3 - hydroxy - 4,4,4 - trifluoro-3-trifluoromethyl butyl benzoate.

4. 1,3 - bis(4,4,4 - trifluoro - 3 - trifluoromethyl butyl)-dibenzoate.

5. 3 - hydroxy - 4,4,4 - trifluoro - 3 - trifluoromethyl butyl acrylate.

6. A polymer having recurring units of the formula:

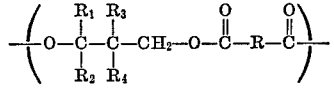

wherein $R_1$ and $R_2$ are perhalogenated alkyl radicals of 1 to 5 carbon atoms in which the halogen atoms are selected from the group consisting of fluorine and chlorine, with at least one fluorine atom being attached to each carbon atom, $R_3$ and $R_4$ are members independently selected from the group consisting of hydrogen and alkyl radicals of 1 to 5 carbon atoms, and R is a residue of a carboxylic acid.

7. Poly[1,3 - (4,4,4 - trifluoro - 3 - trifluoromethyl butyl) - phthalate].

8. A polymer having recurring units of the formula:

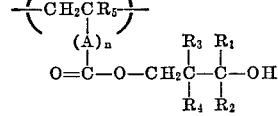

wherein $R_1$ and $R_2$ are perhalogenated alkyl radicals of 1 to 5 carbon atoms, in which the halogen atoms are selected from the group consisting of fluorine and chlorine, with at least one fluorine atom being attached to each carbon atom, $R_3$ and $R_4$ are members independently selected from the group consisting of hydrogen and alkyl radicals of 1 to 5 carbon atoms, $R_5$ is a member of the group consisting of hydrogen and lower alkyl radicals having from 1 to 3 carbon atoms, A is an alkylene radical having from 1 to 3 carbon atoms and $n$ is an integer from 0 to 1.

9. A polymer having recurring units of the formula:

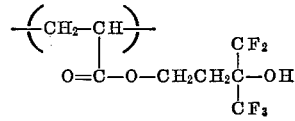

References Cited

UNITED STATES PATENTS 3,274,163  9/1966  Elfers et al. _____ 260—18.4
3,337,644  8/1967  Drysdale _____ 260—633

JOSEPH L. SCHAFER, *Primary Examiner.*

C. A. HENDERSON, JR., *Assistant Examiner.*

U.S. Cl. X.R.

117—161; 260—89.3, 89.5, 476, 478, 486, 633